United States Patent
McVeigh et al.

(10) Patent No.: US 7,953,734 B2
(45) Date of Patent: May 31, 2011

(54) SYSTEM AND METHOD FOR PROVIDING SPI EXTENSIONS FOR CONTENT MANAGEMENT SYSTEM

(75) Inventors: Ryan Sean McVeigh, Broomfield, CO (US); Steven Leslie Roth, Westminster, CO (US); Jalpesh Patadia, Boulder, CO (US); Tanya Saarva, Boulder, CO (US); Xiaojiang Zhou, Broomfield, CO (US); Brad Posner, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1128 days.

(21) Appl. No.: 11/435,163

(22) Filed: May 16, 2006

(65) Prior Publication Data

US 2007/0083484 A1    Apr. 12, 2007

Related U.S. Application Data

(60) Provisional application No. 60/720,860, filed on Sep. 26, 2005.

(51) Int. Cl.
G06F 17/30 (2006.01)
(52) U.S. Cl. .......................... 707/736; 707/781
(58) Field of Classification Search .............. 707/5, 10, 707/102, 104.1, 202, 999.005, 999.01, 999.102, 707/999.104, 999.202, 736, 781
See application file for complete search history.

(56) References Cited

U.S. PATENT DOCUMENTS

| | | | |
|---|---|---|---|
| 5,237,614 A | 8/1993 | Weiss | |
| 5,335,345 A | 8/1994 | Frieder et al. | |
| 5,341,478 A | 8/1994 | Travis, Jr. et al. | |
| 5,347,653 A | 9/1994 | Flynn et al. | |
| 5,355,474 A | 10/1994 | Thuraisngham et al. | |
| 5,369,702 A | 11/1994 | Shanton | |
| 5,426,747 A | 6/1995 | Weinreb et al. | |
| 5,544,322 A | 8/1996 | Cheng et al. | |
| 5,557,747 A | 9/1996 | Rogers et al. | |
| 5,619,710 A | 4/1997 | Travis, Jr. et al. | |

(Continued)

FOREIGN PATENT DOCUMENTS

EP        697662        2/1996

(Continued)

OTHER PUBLICATIONS

International Search Report for PCT/US04/04140, dated Dec. 27, 2005, 2 pages.

(Continued)

*Primary Examiner* — James Trujillo
*Assistant Examiner* — Jorge A Casanova
(74) *Attorney, Agent, or Firm* — Fliesler Meyer LLP

(57) ABSTRACT

In accordance with embodiments, there are provided mechanisms and methods for providing extensions to a Service Provider Interface (SPI) in a content management system. These mechanisms and methods for providing extensions to a Service Provider Interface (SPI) in a content management system can enable embodiments to integrate one or more of a plurality of content repositories into a virtual content repository (VCR) by mapping requests to access content received via a common Application Programming Interface (API) to at least one JSR-170 compliant repository and at least one SPI compliant repository. The ability of embodiments to provide so integrate disparate content repositories can enable one or more of navigation, CRUD operations (create, read, update, delete), versioning, workflows, and searching operations to operate on a plurality of repositories as though the plurality of repositories were one repository.

16 Claims, 4 Drawing Sheets

U.S. PATENT DOCUMENTS

| | | |
|---|---|---|
| 5,627,886 A | 5/1997 | Bowman |
| 5,671,360 A | 9/1997 | Hambrick et al. |
| 5,757,669 A | 5/1998 | Christie et al. |
| 5,806,066 A | 9/1998 | Golshani et al. |
| 5,825,883 A | 10/1998 | Archibald et al. |
| 5,826,000 A | 10/1998 | Hamilton |
| 5,848,396 A | 12/1998 | Gerace |
| 5,867,667 A | 2/1999 | Butman et al. |
| 5,872,928 A | 2/1999 | Lewis et al. |
| 5,873,088 A | 2/1999 | Hiyashi et al. |
| 5,889,953 A | 3/1999 | Thebaut et al. |
| 5,911,143 A | 6/1999 | Deinhart et al. |
| 5,918,210 A | 6/1999 | Rosenthal et al. |
| 5,925,136 A | 7/1999 | Watts |
| 5,941,947 A | 8/1999 | Brown et al. |
| 5,950,195 A | 9/1999 | Stockwell et al. |
| 5,954,798 A | 9/1999 | Shelton et al. |
| 5,956,400 A | 9/1999 | Chaum et al. |
| 5,966,707 A | 10/1999 | Van Huben et al. |
| 5,987,469 A | 11/1999 | Lewis et al. |
| 5,987,611 A | 11/1999 | Freund |
| 6,006,194 A | 12/1999 | Merel |
| 6,014,666 A | 1/2000 | Helland et al. |
| 6,023,765 A | 2/2000 | Kuhn |
| 6,029,144 A | 2/2000 | Barrett et al. |
| 6,029,182 A | 2/2000 | Nehab et al. |
| 6,029,196 A | 2/2000 | Lenz |
| 6,054,910 A | 4/2000 | Tada et al. |
| 6,055,515 A | 4/2000 | Consentino et al. |
| 6,073,242 A | 6/2000 | Hardy et al. |
| 6,083,276 A | 7/2000 | Davidson et al. |
| 6,088,679 A | 7/2000 | Barkley |
| 6,098,173 A | 8/2000 | Elgressy et al. |
| 6,108,687 A | 8/2000 | Craig |
| 6,122,647 A | 9/2000 | Horowitz et al. |
| 6,141,010 A | 10/2000 | Hoyle |
| 6,141,686 A | 10/2000 | Jackowski et al. |
| 6,148,333 A | 11/2000 | Guedalia et al. |
| 6,154,844 A | 11/2000 | Touboul et al. |
| 6,157,924 A | 12/2000 | Austin |
| 6,158,010 A | 12/2000 | Moriconi et al. |
| 6,161,139 A | 12/2000 | Win et al. |
| 6,167,407 A | 12/2000 | Nachenberg et al. |
| 6,167,445 A | 12/2000 | Gai et al. |
| 6,167,448 A | 12/2000 | Hemphill et al. |
| 6,169,794 B1 | 1/2001 | Oshimi et al. |
| 6,170,009 B1 | 1/2001 | Mandal et al. |
| 6,178,172 B1 | 1/2001 | Rochberger |
| 6,182,142 B1 | 1/2001 | Win et al. |
| 6,182,226 B1 | 1/2001 | Reid et al. |
| 6,182,277 B1 | 1/2001 | Degroot et al. |
| 6,185,587 B1 | 2/2001 | Bernardo et al. |
| 6,188,399 B1 | 2/2001 | Voas et al. |
| 6,195,696 B1 | 2/2001 | Baber et al. |
| 6,202,066 B1 | 3/2001 | Barkley et al. |
| 6,202,157 B1 | 3/2001 | Brownlie et al. |
| 6,202,207 B1 | 3/2001 | Donohue |
| 6,205,466 B1 | 3/2001 | Karp et al. |
| 6,209,101 B1 | 3/2001 | Mitchem et al. |
| 6,216,134 B1 | 4/2001 | Heckerman et al. |
| 6,216,231 B1 | 4/2001 | Stubblebine |
| 6,226,745 B1 | 5/2001 | Wiederhold |
| 6,233,576 B1 | 5/2001 | Lewis |
| 6,236,991 B1 | 5/2001 | Frauenhofer et al. |
| 6,241,608 B1 | 6/2001 | Torango |
| 6,243,747 B1 | 6/2001 | Lewis et al. |
| 6,253,321 B1 | 6/2001 | Nikander et al. |
| 6,256,741 B1 | 7/2001 | Stubblebine |
| 6,260,050 B1 | 7/2001 | Yost et al. |
| 6,269,393 B1 | 7/2001 | Yost et al. |
| 6,269,456 B1 | 7/2001 | Hodges et al. |
| 6,275,941 B1 | 8/2001 | Saito et al. |
| 6,278,452 B1 | 8/2001 | Huberman et al. |
| 6,285,366 B1 | 9/2001 | Ng et al. |
| 6,285,983 B1 | 9/2001 | Jenkins |
| 6,285,985 B1 | 9/2001 | Horstmann |
| 6,292,900 B1 | 9/2001 | Ngo et al. |
| 6,295,607 B1 | 9/2001 | Johnson |
| 6,301,613 B1 | 10/2001 | Ahlstrom et al. |
| 6,304,881 B1 | 10/2001 | Halim et al. |
| 6,308,163 B1 | 10/2001 | Du et al. |
| 6,317,868 B1 | 11/2001 | Grimm et al. |
| 6,321,336 B1 | 11/2001 | Applegate et al. |
| 6,327,594 B1 | 12/2001 | Van Huben et al. |
| 6,327,618 B1 | 12/2001 | Ahlstrom et al. |
| 6,327,628 B1 | 12/2001 | Anuff |
| 6,336,073 B1 | 1/2002 | Ihara et al. |
| 6,339,423 B1 | 1/2002 | Sampson et al. |
| 6,339,826 B2 | 1/2002 | Hayes, Jr. et al. |
| 6,341,352 B1 | 1/2002 | Child et al. |
| 6,349,297 B1 | 2/2002 | Shaw et al. |
| 6,353,886 B1 | 3/2002 | Howard et al. |
| 6,357,010 B1 | 3/2002 | Viets |
| 6,360,230 B1 | 3/2002 | Chan et al. |
| 6,360,363 B1 | 3/2002 | Moser et al. |
| 6,366,915 B1 | 4/2002 | Rubert et al. |
| 6,377,973 B2 | 4/2002 | Gideon |
| 6,381,579 B1 | 4/2002 | Gervais et al. |
| 6,385,627 B1 | 5/2002 | Cragun |
| 6,393,474 B1 | 5/2002 | Eichert et al. |
| 6,397,222 B1 | 5/2002 | Zellweger |
| 6,397,231 B1 | 5/2002 | Salisbury et al. |
| 6,412,070 B1 | 6/2002 | Van Dyke et al. |
| 6,412,077 B1 | 6/2002 | Roden et al. |
| 6,418,448 B1 | 7/2002 | Sarkar |
| 6,430,556 B1 | 8/2002 | Goldberg et al. |
| 6,434,607 B1 | 8/2002 | Haverstock et al. |
| 6,438,563 B1 | 8/2002 | Kawagoe |
| 6,449,638 B1 | 9/2002 | Wecker et al. |
| 6,457,007 B1 | 9/2002 | Kikuchi et al. |
| 6,460,084 B1 | 10/2002 | Van Horne et al. |
| 6,460,141 B1 | 10/2002 | Olden |
| 6,463,440 B1 | 10/2002 | Hind et al. |
| 6,466,239 B2 | 10/2002 | Ishikawa |
| 6,466,932 B1 | 10/2002 | Dennis et al. |
| 6,473,791 B1 | 10/2002 | Al-Ghosein et al. |
| 6,477,543 B1 | 11/2002 | Huang et al. |
| 6,477,575 B1 | 11/2002 | Koeppel et al. |
| 6,484,177 B1 | 11/2002 | Van Huben et al. |
| 6,484,261 B1 | 11/2002 | Wiegel |
| 6,487,594 B1 | 11/2002 | Bahlmann |
| 6,510,513 B1 | 1/2003 | Danieli |
| 6,519,647 B1 | 2/2003 | Howard et al. |
| 6,530,024 B1 | 3/2003 | Proctor |
| 6,539,375 B2 | 3/2003 | Kawasaki |
| 6,542,993 B1 | 4/2003 | Erfani |
| 6,571,247 B1 | 5/2003 | Danno et al. |
| 6,574,736 B1 | 6/2003 | Andrews |
| 6,581,054 B1 | 6/2003 | Bogrett |
| 6,581,071 B1 | 6/2003 | Gustman et al. |
| 6,584,454 B1 | 6/2003 | Hummel, Jr. et al. |
| 6,587,849 B1 | 7/2003 | Mason et al. |
| 6,587,876 B1 | 7/2003 | Mahon et al. |
| 6,615,218 B2 | 9/2003 | Mandal et al. |
| 6,618,806 B1 | 9/2003 | Brown et al. |
| 6,633,538 B1 | 10/2003 | Tanaka et al. |
| 6,654,747 B1 | 11/2003 | Van Huben et al. |
| 6,665,677 B1 | 12/2003 | Wotring et al. |
| 6,668,354 B1 | 12/2003 | Chen et al. |
| 6,671,689 B2 | 12/2003 | Papierniak |
| 6,684,369 B1 | 1/2004 | Bernardo et al. |
| 6,694,306 B1 | 2/2004 | Nishizawa |
| 6,697,805 B1 | 2/2004 | Choquier et al. |
| 6,715,077 B1 | 3/2004 | Vasudevan et al. |
| 6,721,888 B1 | 4/2004 | Liu et al. |
| 6,728,713 B1 | 4/2004 | Beach et al. |
| 6,732,144 B1 | 5/2004 | Kizu et al. |
| 6,735,586 B2 | 5/2004 | Timmons |
| 6,735,624 B1 | 5/2004 | Rubin et al. |
| 6,735,701 B1 | 5/2004 | Jacobson |
| 6,738,789 B2 | 5/2004 | Multer |
| 6,745,207 B2 | 6/2004 | Reuter et al. |
| 6,751,657 B1 | 6/2004 | Zothner |
| 6,751,659 B1 | 6/2004 | Fenger et al. |
| 6,754,672 B1 | 6/2004 | McLauchlin |
| 6,757,698 B2 | 6/2004 | McBride et al. |
| 6,757,822 B1 | 6/2004 | Feiertag et al. |

| | | | | | | |
|---|---|---|---|---|---|---|
| 6,769,095 B1 | 7/2004 | Brassard et al. | | 7,437,362 B1 | 10/2008 | Ben-Natan |
| 6,769,118 B2 | 7/2004 | Garrison et al. | | 7,467,399 B2 | 12/2008 | Nadalin et al. |
| 6,772,157 B2 | 8/2004 | Barnett et al. | | 2001/0009016 A1 | 7/2001 | Hofmann et al. |
| 6,772,332 B1 | 8/2004 | Boebert et al. | | 2001/0032128 A1 | 10/2001 | Kepecs |
| 6,779,002 B1 | 8/2004 | Mwaura | | 2001/0034771 A1 | 10/2001 | Hutsch et al. |
| 6,789,202 B1 | 9/2004 | Ko et al. | | 2001/0034774 A1 | 10/2001 | Watanabe et al. |
| 6,792,537 B1 | 9/2004 | Liu et al. | | 2001/0039586 A1 | 11/2001 | Primak et al. |
| 6,832,313 B1 | 12/2004 | Parker | | 2001/0044810 A1 | 11/2001 | Timmons |
| 6,834,284 B2 | 12/2004 | Acker et al. | | 2001/0047485 A1 | 11/2001 | Brown et al. |
| 6,853,997 B2 | 2/2005 | Wotring et al. | | 2002/0005867 A1 | 1/2002 | Gvily |
| 6,854,035 B2 | 2/2005 | Dunham et al. | | 2002/0010741 A1 | 1/2002 | Stewart |
| 6,856,999 B2 | 2/2005 | Flanagin et al. | | 2002/0019827 A1 | 2/2002 | Shiman et al. |
| 6,857,012 B2 | 2/2005 | Sim et al. | | 2002/0023122 A1 | 2/2002 | Polizzi et al. |
| 6,865,549 B1 | 3/2005 | Connor | | 2002/0029296 A1 | 3/2002 | Anuff et al. |
| 6,873,988 B2 | 3/2005 | Herrmann et al. | | 2002/0046099 A1 | 4/2002 | Frengut et al. |
| 6,880,005 B1 | 4/2005 | Bell et al. | | 2002/0059394 A1 | 5/2002 | Sanders |
| 6,886,100 B2 | 4/2005 | Harrah et al. | | 2002/0062451 A1 | 5/2002 | Scheidt et al. |
| 6,889,222 B1 | 5/2005 | Zhao | | 2002/0067370 A1 | 6/2002 | Forney et al. |
| 6,901,403 B1 | 5/2005 | Bata et al. | | 2002/0069261 A1 | 6/2002 | Bellare et al. |
| 6,904,454 B2 | 6/2005 | Stickler | | 2002/0087571 A1 | 7/2002 | Stapel et al. |
| 6,912,538 B2 | 6/2005 | Stapel et al. | | 2002/0103818 A1 | 8/2002 | Amberden |
| 6,917,975 B2 | 7/2005 | Griffin et al. | | 2002/0104071 A1 | 8/2002 | Charisius et al. |
| 6,918,088 B2 | 7/2005 | Clark et al. | | 2002/0107913 A1 | 8/2002 | Rivera et al. |
| 6,920,457 B2 | 7/2005 | Pressmar | | 2002/0107920 A1 | 8/2002 | Hotti |
| 6,922,695 B2 | 7/2005 | Skufca | | 2002/0111998 A1 | 8/2002 | Kim |
| 6,925,487 B2 | 8/2005 | Kim | | 2002/0112171 A1 | 8/2002 | Ginter et al. |
| 6,928,554 B2 | 8/2005 | Dettinger et al. | | 2002/0120685 A1 | 8/2002 | Srivastava et al. |
| 6,931,549 B1 | 8/2005 | Ananda | | 2002/0124053 A1 | 9/2002 | Adams et al. |
| 6,934,532 B2 | 8/2005 | Coppinger et al. | | 2002/0135617 A1 | 9/2002 | Samid |
| 6,934,934 B1 | 8/2005 | Osborne | | 2002/0143819 A1 | 10/2002 | Han et al. |
| 6,947,989 B2 | 9/2005 | Gullotta et al. | | 2002/0147645 A1 | 10/2002 | Alao et al. |
| 6,950,825 B2 | 9/2005 | Chang et al. | | 2002/0147696 A1 | 10/2002 | Acker |
| 6,957,261 B2 | 10/2005 | Lortz | | 2002/0147801 A1 | 10/2002 | Gullotta et al. |
| 6,961,897 B1 | 11/2005 | Peel et al. | | 2002/0152267 A1 | 10/2002 | Lennon |
| 6,965,999 B2 | 11/2005 | Fox et al. | | 2002/0152279 A1 | 10/2002 | Sollenberger et al. |
| 6,970,445 B2 | 11/2005 | O'Neill et al. | | 2002/0161903 A1 | 10/2002 | Besaw |
| 6,970,840 B1 | 11/2005 | Yu et al. | | 2002/0169893 A1 | 11/2002 | Chen et al. |
| 6,970,876 B2 | 11/2005 | Hotti et al. | | 2002/0169975 A1 | 11/2002 | Good |
| 6,978,379 B1 | 12/2005 | Goh et al. | | 2002/0173971 A1 | 11/2002 | Stirpe et al. |
| 6,985,915 B2 | 1/2006 | Somalwar et al. | | 2002/0178119 A1 | 11/2002 | Griffin et al. |
| 6,987,580 B2 | 1/2006 | Watanabe et al. | | 2002/0188869 A1 | 12/2002 | Patrick |
| 6,988,138 B1 | 1/2006 | Alcorn et al. | | 2002/0194267 A1 | 12/2002 | Flesner et al. |
| 7,003,578 B2 | 2/2006 | Kanada et al. | | 2003/0014442 A1 | 1/2003 | Shiigi et al. |
| 7,013,311 B2 * | 3/2006 | Hui et al. ................... 707/104.1 | | 2003/0032409 A1 | 2/2003 | Hutcheson et al. |
| 7,013,485 B2 | 3/2006 | Brown et al. | | 2003/0033315 A1 | 2/2003 | Winkler |
| 7,035,857 B2 | 4/2006 | Reeves et al. | | 2003/0046576 A1 | 3/2003 | High, Jr. et al. |
| 7,035,879 B2 | 4/2006 | Shi et al. | | 2003/0065721 A1 | 4/2003 | Roskind |
| 7,035,944 B2 | 4/2006 | Fletcher et al. | | 2003/0069874 A1 | 4/2003 | Hertzog |
| 7,043,472 B2 | 5/2006 | Aridor et al. | | 2003/0078959 A1 | 4/2003 | Yeung et al. |
| 7,043,685 B2 | 5/2006 | Azuma | | 2003/0078972 A1 | 4/2003 | Tapissier et al. |
| 7,047,522 B1 | 5/2006 | Dixon et al. | | 2003/0088617 A1 | 5/2003 | Clark et al. |
| 7,051,016 B2 | 5/2006 | Winkler | | 2003/0110448 A1 | 6/2003 | Haut et al. |
| 7,051,071 B2 | 5/2006 | Stewart | | 2003/0115484 A1 | 6/2003 | Moriconi et al. |
| 7,051,316 B2 | 5/2006 | Charisius et al. | | 2003/0120686 A1 | 6/2003 | Kim et al. |
| 7,054,910 B1 | 5/2006 | Nordin et al. | | 2003/0126236 A1 | 7/2003 | Marl et al. |
| 7,062,490 B2 | 6/2006 | Adya et al. | | 2003/0126464 A1 | 7/2003 | McDaniel et al. |
| 7,062,511 B1 | 6/2006 | Poulsen | | 2003/0126558 A1 | 7/2003 | Griffin |
| 7,076,652 B2 | 7/2006 | Ginter et al. | | 2003/0131113 A1 | 7/2003 | Reeves et al. |
| 7,080,000 B1 | 7/2006 | Cambridge | | 2003/0135490 A1 | 7/2003 | Barrett et al. |
| 7,085,755 B2 | 8/2006 | Bluhm et al. | | 2003/0140308 A1 | 7/2003 | Murthy et al. |
| 7,085,994 B2 | 8/2006 | Gvily | | 2003/0145275 A1 | 7/2003 | Qian et al. |
| 7,089,584 B1 | 8/2006 | Sharma | | 2003/0146937 A1 | 8/2003 | Lee |
| 7,093,200 B2 | 8/2006 | Schreiber et al. | | 2003/0167315 A1 | 9/2003 | Chowdhry et al. |
| 7,093,261 B1 | 8/2006 | Harper et al. | | 2003/0167455 A1 | 9/2003 | Iborra et al. |
| 7,093,283 B1 | 8/2006 | Chen et al. | | 2003/0182577 A1 | 9/2003 | Mocek |
| 7,096,224 B2 | 8/2006 | Murthy et al. | | 2003/0187956 A1 | 10/2003 | Belt et al. |
| 7,111,321 B1 | 9/2006 | Watts et al. | | 2003/0188085 A1 | 10/2003 | Arakawa et al. |
| 7,124,192 B2 | 10/2006 | High et al. | | 2003/0200350 A1 | 10/2003 | Kumar et al. |
| 7,124,413 B1 | 10/2006 | Klemm et al. | | 2003/0204481 A1 | 10/2003 | Lau |
| 7,134,076 B2 | 11/2006 | Bahrs et al. | | 2003/0212766 A1 | 11/2003 | Giles et al. |
| 7,146,564 B2 | 12/2006 | Kim et al. | | 2003/0216938 A1 | 11/2003 | Shour |
| 7,174,563 B1 | 2/2007 | Brownlie et al. | | 2003/0220913 A1 | 11/2003 | Doganata et al. |
| 7,185,192 B1 | 2/2007 | Khan | | 2003/0220963 A1 | 11/2003 | Golovinsky et al. |
| 7,219,140 B2 | 5/2007 | Marl et al. | | 2003/0229501 A1 | 12/2003 | Copeland et al. |
| 7,240,076 B2 | 7/2007 | McCauley et al. | | 2003/0229623 A1 | 12/2003 | Chang et al. |
| 7,260,830 B2 | 8/2007 | Sugimoto | | 2004/0003071 A1 | 1/2004 | Mathew et al. |
| 7,269,664 B2 | 9/2007 | Hutsch et al. | | 2004/0010719 A1 | 1/2004 | Daenen |
| 7,272,625 B1 | 9/2007 | Hannel et al. | | 2004/0019650 A1 | 1/2004 | Auvenshine |
| 7,349,913 B2 | 3/2008 | Clark et al. | | 2004/0024812 A1 | 2/2004 | Park et al. |

| | | | |
|---|---|---|---|
| 2004/0030744 | A1 | 2/2004 | Rubin et al. |
| 2004/0030795 | A1 | 2/2004 | Hesmer et al. |
| 2004/0044655 | A1 | 3/2004 | Cotner et al. |
| 2004/0064633 | A1 | 4/2004 | Oota |
| 2004/0078371 | A1 | 4/2004 | Worrall et al. |
| 2004/0093344 | A1 | 5/2004 | Berger |
| 2004/0098383 | A1 | 5/2004 | Tabellion et al. |
| 2004/0098467 | A1 | 5/2004 | Dewey et al. |
| 2004/0098470 | A1 | 5/2004 | Kurihara |
| 2004/0098606 | A1 | 5/2004 | Tan et al. |
| 2004/0107360 | A1 | 6/2004 | Herrmann et al. |
| 2004/0125144 | A1 | 7/2004 | Yoon |
| 2004/0162733 | A1 | 8/2004 | Griffin |
| 2004/0162905 | A1 | 8/2004 | Griffin |
| 2004/0162906 | A1 | 8/2004 | Griffin |
| 2004/0167880 | A1 | 8/2004 | Smith |
| 2004/0167899 | A1 | 8/2004 | Patadia et al. |
| 2004/0168084 | A1 | 8/2004 | Owen et al. |
| 2004/0181543 | A1* | 9/2004 | Wu et al. ........................ 707/102 |
| 2004/0205473 | A1 | 10/2004 | Fisher et al. |
| 2004/0205557 | A1 | 10/2004 | Bahrs et al. |
| 2004/0215635 | A1 | 10/2004 | Chang et al. |
| 2004/0215650 | A1 | 10/2004 | Shaji et al. |
| 2004/0230546 | A1 | 11/2004 | Rogers |
| 2004/0236760 | A1 | 11/2004 | Arkeketa et al. |
| 2004/0243824 | A1 | 12/2004 | Jones |
| 2005/0021502 | A1 | 1/2005 | Chen et al. |
| 2005/0021656 | A1 | 1/2005 | Callegari |
| 2005/0050184 | A1 | 3/2005 | Boden et al. |
| 2005/0060324 | A1 | 3/2005 | Johnson et al. |
| 2005/0086206 | A1 | 4/2005 | Balasubramanian et al. |
| 2005/0086469 | A1 | 4/2005 | Dunagan et al. |
| 2005/0097008 | A1 | 5/2005 | Ehring et al. |
| 2005/0198617 | A1 | 9/2005 | Kim et al. |
| 2005/0203910 | A1 | 9/2005 | Taguchi et al. |
| 2005/0256894 | A1 | 11/2005 | Talanis et al. |
| 2005/0257267 | A1 | 11/2005 | Williams et al. |
| 2006/0005150 | A1 | 1/2006 | Pankovcin |
| 2006/0059107 | A1 | 3/2006 | Elmore et al. |
| 2006/0085412 | A1 | 4/2006 | Johnson et al. |
| 2006/0122882 | A1 | 6/2006 | Brown et al. |
| 2006/0143464 | A1 | 6/2006 | Ananthanarayanan et al. |
| 2006/0167858 | A1 | 7/2006 | Dennis et al. |
| 2006/0225123 | A1 | 10/2006 | Childress et al. |
| 2006/0248092 | A1* | 11/2006 | Keller et al. ................. 707/100 |
| 2006/0277594 | A1 | 12/2006 | Chiavegatto et al. |
| 2007/0083484 | A1 | 4/2007 | McVeigh et al. |
| 2007/0294743 | A1 | 12/2007 | Kaler et al. |

FOREIGN PATENT DOCUMENTS

| | | |
|---|---|---|
| EP | 1 256 889 | 11/2002 |
| WO | 00/38078 | 6/2000 |
| WO | 01/14962 | 3/2001 |
| WO | 01/67285 | 9/2001 |
| WO | 01/77823 | 10/2001 |
| WO | 02/063496 | 8/2002 |
| WO | 02/075597 | 9/2002 |

OTHER PUBLICATIONS

Iper for PCT/US02/11969, dated Dec. 1, 2004, 2 pages.

Joshi, J., et al., "Security Models for Web-Based Applications," Communications of the ACM, vol. 44, No. 2, pp. 38-44 (2001).

Kistler, Thomas, et al., "WebL—a Programming Language for the Web," Computer Networks and ISDN Systems, North Holland Publishing, Amsterdam, NL, vol. 30, No. 1-7, pp. 259-270 (Apr. 1998).

Lee, Amy J., et al., "Keeping Virtual Information Resources up and Running," IBM Press, pp. 1-14 (Nov. 1997).

Levy, Michael R., "Web Programming in Guide," Software Practice & Experience, Wiley & Sons, Bognor Regis, GB, vol. 28, No. 15, Dec. 25, 1998, pp. 1581-1603.

Microsoft Computer Dictionary, 4th Edition, Microsoft Press, Redmond, WA, p. 489 (1999).

Microsoft Computer Dictionary, 5th Edition, Microsoft Press, Redmond, WA, pp. 115, 176 and 542 (2002).

Microsoft Windows ("Windows Explorer") copyright 1981-2001, 3 pages.

Moore, Bill et al., "Migrating Weblogic Applications to WebSphere Advanced Edition", IBM Redbooks, pp. 1, 3-4, 109-111 and 181-195 (Jan. 2001).

Moran et al., "Multimodal User Interfaces in the Open Agent Architecture", ACM 0-89791-839-8/96/01, IUI, Orlando, Florida USA (1997) pp. 61-68.

Na, Sang Yeob, et al., "Role Delegation in Role-Based Access Control," ACM Workshop on Role-Based Access Control, RBAC, Berlin, Germany, pp. 39-44 (2000).

Nuescheler, David, et al., "Java Content Repository-JSR-170," version 0.1, Apr. 24, 2002, version 0.2 May 10, 2004, version 0.3 May 17, 2002, version 0.4 Jul. 17, 2002, version 0.5 Sep. 16, 2002, and version 0.6 Nov. 26, 2002, pp. 1-99.

Oh, Sejong, et al., "Enterprise Model as a Basis of Administration on Role-Based Access Control," IEEE, pp. 150-158 (2001).

Okamoto, Eiji, "Proposal for Integrated Security Systems," IEEE Computer Society Press, pp. 354-358 (Jun. 1992).

Park, Joon S., "Role-Based Access Control on the Web," ACM Transactions on Information and System Security, vol. 4, No. 1, pp. 37-71(Feb. 2001).

Parker, Elisabeth, "The Complete Idiot's Guide® to Microsoft® FrontPage 2000", QUE®, Indianapolis, IN, pp. 7 and 52 (1999).

Porwal, Priyank, "Automating Optimistic Access Control Systems," 10 pages.

Povey, Dean, "Optimistic Security: A New Access Control Paradigm," 6 pages.

Rossi, Gustavo, et al., "Designing Personalized Web Applications," ACM, WWW 10, Hong Kong, May 1-5, 2001, pp. 275-284.

Rouff, "Formal Specification of User Interfaces", SIGHIC Bulletin, vol. 28, No. 3 (Jul. 1996) pp. 27-33.

Sandhu, Ravi S., et al., "Role-Based Access Control Models," IEEE Computer, vol. 29, No. 2, pp. 38-47 (1996).

Sandhu, Ravi S., et al., "The ARBAC97 Model for Role-Based Administration of Roles," ACM Transactions on Information and System Security vol. 2, No. 1, pp. 105-135 (Feb. 1999).

Sandhu, Ravi S., et al., "The RRA97 Model for Role-Based Administration of Role Hierarchies," ACSAC, pp. 39-49 (1998).

Shim, Won Bo, et al. "Implementing Web Access Control System for the Multiple Web Servers in the Same Domain Using RBAC Concept," IEEE, pp. 768-773 (2001).

Stephanidis, Constantine, et al., "Decision Making in Intelligent User Interfaces," IUI '97, Orlando, FL, US, ACM, pp. 195-202 (1997).

Stiemerling, Oliver, et al., "How to Make Software Softer—Designing Tailorable Applications," DIS '97, Amsterdam, The Netherlands, ACM, pp. 365-376 (1997).

Sunsted, Todd, "JNDI Overview, Part 1: An Introduction to Naming Services", JavaWorld, Jan. 2000, pp. 1-6, (downloaded from www.javaworld.com/javaworld/jw-012000/jw-01-howto_p.html).

Supplementary European Search Report for EP 01 97 5484 dated Dec. 19, 2006 (2 pages).

Supplementary European Search Report for EP 02 7238740.0 dated Jun. 7, 2006 (3 pages).

Supplementary European Search Report for EP 02 773915.0 dated Oct. 12, 2006 (3 pages).

Symborski, Carl W., "Updating Software and Configuration Data in a Distributed Communications Network," IEEE Computer Networking Symposium, pp. 331-338 (1988).

Tanyi, Emmanuel, "Easy XML," www.winsite.com, pp. 1-6 (Mar. 2000).

Tzelepi, Sofia K., et al., "A Flexible Content and Context-Based Access Control Model for Multimedia Medical Image Database Systems," International Multimedia Conference, Proceedings of the 2001 Workshop on Multimedia and Security, Oct. 5, 2001, pp. 52-55.

USDatacenters . . . eBusiness, Business Wire, Apr. 4, 2001, p. 2079.

Visveswaran, Siva, "Dive into Connection Pooling with J2EE," reprinted from JavaWorld, 7 pages (Oct. 2000).

Yao, Walt, et al., "A Model of OASIS Role-Based Access Control and its Support for Active Security," ACM Workshop on Role Based Access Control, Proceedings of the Sixth ACM Symposium on Access Control Methods and Technologies, pp. 171-181 (2001).

Zhang, Zheng, et al., "Designing a Robust Namespace for Distributed File Services," Reliable Distributed System, Proceedings 20th IEEE Symposium on Oct. 28-31, 2001, pp. 162-171.

An Introduction to BEA WebLogic® Server Security: The New Security Architecture of BEA WebLogic Server™ 7.0, BEA White Paper, May 1, 2002, 20 pages.

"Combined-User Interface for Computers, Television, Video Recorders, and Telephone, etc . . . ," IBM Technical Disclosure Bulletin, US, pp. 116-118 (Aug. 1990).

"Guide to Using the BEA E-Business Control Center," BEA Web Logic Portal, Version 4.0 (Oct. 2001) 356 pages.

"Method and System for Visually Constructing Document Type Definitions and Related Artifacts Using a Reusable Object Model," IBM Technical Disclosures Bulletin, May 31, 2001, 3 pages.

Adomavicius, Gediminas, et al., "User Profiling in Personalization Applications Through Rule Discovery and Validation," KDD '99, San Diego, CA, US, ACM, pp. 377-381(1999).

Adya, Atul, et al., "FARSITE: Federated, Available, and Reliable Storage for an Incompletely Trusted Environment," ACM SIGOPS Operating Systems Review, vol. 36, Issue S1 (Winter 2002), OSDI '02, Proceedings of the 5th Symposium on Operating Systems Design and Implementation, pp. 1-14.

Ahn, Gail-Joon, et al. Role-Based Authorization Constraints Specification Using Object Constraint Language, IEEE, pp. 157-162 (2001).

Atkins, David L., et al., "MAWL: A Domain Specific Language for Form-Based Services," IEEE Transactions on Software Engineering, IEEE Service Center, Los Alamitos, CA, US, vol. 25, No. 3, pp. 334-346 (May 1999).

Ayers, Danny et al., "Professional Java Server Programming," Wrox Press, Ltd., Birmingham, UK, Dec. 1999, pp. 515-545.

Baltimore SelectAccess™ next generation authorization management, www.baltimore.com, 8 pages (2001).

Barrett, Alexandra, "Trying Out Transactions", SunExpert Magazine, Jan. 1999, pp. 57-59.

BEA Systems, "WebLogic Server™ 6.1 has been released," The ServerSide.com, Sep. 13, 2001, 6 pages.

BEA WebLogic Portal-Development Guide, Release 7.0, Service Pack 1, Document Date Dec. 2002, 626 pages.

BEA WebLogic Server™, "Assembling and Configuring Web Applications," BEA Systems Release 7.0, Revised Aug. 20, 2002, 165 pages.

BEA WebLogic Server™, "Developing Security Providers for WebLogic Server," BEA Systems Release 7.0, Revised Aug. 30, 2002, 315 pages.

BEA WebLogic Server™, "Introduction to WebLogic Security," BEA Systems Release 7.0, Document Date Jun. 2002, Revised Jun. 28, 2002, 22 pages.

Bertino, Elisa, et al., "TRBAC: A Temporal Role-Based Access Control Model," ACM Transactions on Information and System Security (TISSEC), vol. 4, Issue 3, pp. 191-223 (Aug. 2001).

Browne, Shirley V., et al., Reuse Library Interoperability and the World Wide Web, ACM, pp. 182-189 (1997).

Browne, Shirley, et al. "Location-Independent Naming for Virtual Distributed Software Repositories,"ACM Symposium on Software Reusability, Seattle, WA, US, vol. 20, Issue SI, pp. 179-185 (Aug. 1995).

Browne, Shirley, et al., "Technologies for Repository Interoperation and Access Control," ACM, pp. 40-48 (1995).

Catley, Christina, et al. "Design of a Health Care Architecture for Medical Data Interoperability and Application Integration," Proceedings of the Second Joint EMBS/BMES Conference, Houston, TX, US, Oct. 23-26, 2002, IEEE, vol. 3, pp. 1952-1953.

Candan, K.S., et al. "Enabling Dynamic Content Caching for Database-Driven Websites," Proceedings of the 2001 ACM SIGMOD International Conference on Management of Data, Santa Barbara, CA, US, pp. 532-543 (2001).

Cingil, Ibrahim, et al., "A Broader Approach to Personalization," Communications of the ACM, vol. 43, No. 6, pp. 136-141 (Aug. 2000).

Costello, S., "Baltimore to Release SelectAccess 5.0 with SAML," Apr. 24, 2002, www.infoworld.com/articles/hn/xml/02/02/24/020424hnsaml.html, printed Feb. 17, 2006.

Covington, Michael J., et al., "Securing Context-Aware Applications Using Environment Roles," ACM Workshop on Role Based Access Control, Proceedings of the Sixth ACM Symposium on Access Control Models and Technologies, pp. 10-20 (2001).

Faden, Glenn, "RBAC in UNIX Administration," ACM Workshop on Role-Based Access Control, pp. 95-101 (1999).

First Data Chooses Baltimore SelectAccess to Secure Extranet Applications, Mar. 5, 2002, 2 pages.

Ford, Nigel, "Web Developer.com Guide to Building Intelligent Web Sites with JavaScript," Wiley Computer Publishing, NY, 1998, pp. 65-86, 96-98, 245-250 and 324-327.

Freudenthal, Eric, et al., "dRBAC: Distributed Role-Based Access Control for Dynamic Coalition Environments," Proceedings of the 22nd International Conference on Distributed Computing Systems (ICDCS '02) IEEE 2002, 10 pages.

Georgiadis, Christos K., et al., "Flexible Team-Based Access Control Using Contexts," ACM Workshop on Role Based Access Control, Proceedings of the Sixth ACM Symposium on Access Control Methods and Technologies, pp. 21-27 (2001).

Goh, Cheh, et al., "Towards a more Complete Model of Role," Symposium on Access Control Models and Technologies, Proceedings of the Third ACM Workshop on Role-Based Access Control, pp. 55-61 (1998).

Gustafsson, Mats, et al., "Using NFS to Implement Role-Based Access Control," IEEE, pp. 299-304 (1997).

Hayton, R.J., et al., "Access Control in an Open Distributed Environment," 12 pages (1998).

Howes, T., "The String Representation of LDAP Search Filters," © The Internet Society, RFC 2254, 8 pages (Dec. 1997).

http://java.sun.com/products/ejb/(last visit Dec. 7, 2004), 2 pages.

http://javaworld.com/jw-12-2002/jw-1207-yesnoejb_p.html (last visit Dec. 7, 2004), 2 pages.

http://portal.acm.org/citation.cfm?id=1011436, 1 page, last visited: Oct. 24, 2007.

Hunter, Jason, "Java Servlet Programming," second edition, O'Reilly, Apr. 11, 2001, 20 pages.

International Search Report and Written Opinion for PCT/US04/04079 dated Aug. 24, 2004, 6 pages.

International Search Report and Written Opinion for PCT/US04/04691 dated Sep. 24, 2004, 6 pages.

International Search Report for PCT/US02/34006, dated Jan. 13, 2003, 3 pages.

International Search Report for PCT/US02/34007, dated Jan. 21, 2003, 3 pages.

International Search Report for PCT/US02/34008, dated Dec. 31, 2002, 5 pages.

International Search Report for PCT/US02/34048, dated Dec. 23, 2002, 2 pages.

International Search Report for PCT/US02/34088, dated Mar. 7, 2003, 3 pages.

International Search Report for PCT/US02/34089, dated Feb. 19, 2003, 4 pages.

International Search Report for PCT/US02/34308, dated Mar. 5, 2003, 4 pages.

International Search Report for PCT/US02/34309, dated Feb. 14, 2003, 4 pages.

International Search Report for PCT/US04/04078, dated Dec. 15, 2005, 2 pages.

* cited by examiner

SYSTEM AND METHOD FOR PROVIDING SPI EXTENSIONS FOR CONTENT MANAGEMENT SYSTEM

CLAIM OF PRIORITY

This application claims the benefit of U.S. Provisional Patent Application No. 60/720,860 entitled IMPROVED CONTENT MANAGEMENT, by Ryan McVeigh et al., filed Sep. 26, 2005, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending U.S. patents and patent applications, including the present application, are related to each other. Each of the other patents/applications are incorporated by reference herein in their entirety:

U.S. patent application Ser. No. 11/499,468 entitled SYSTEM AND METHOD FOR CONTENT MANAGEMENT SECURITY, by Ryan McVeigh et al., filed on Aug. 4, 2006;

U.S. patent application Ser. No. 11/499,114 entitled SYSTEM AND METHOD FOR INTERACTING WITH A VIRTUAL CONTENT REPOSITORY, by Ryan McVeigh et al., filed on Aug. 4, 2006; and U.S. patent application Ser. No. 11/473,571 entitled SYSTEM AND METHOD FOR PROVIDING AN SPI BRIDGE FOR CONTENT MANAGEMENT SYSTEM, by Ryan. McVeigh et al., filed on Jun. 23, 2006.

FIELD OF THE INVENTION

The current invention relates generally to managing content for use with portals and other content delivery mechanisms, and more particularly to a mechanism for providing extensions to a Service Provider Interface (SPI) in a content management system.

BACKGROUND

Content repositories manage and provide access to large data stores such as a newspaper archives, advertisements, inventories, image collections, etc. A content repository can be a key component of a web application such as a portal, which must quickly serve up different types of content in response to user interaction. However, difficulties can arise when trying to integrate more than one vendor's content repository. Each may have its own proprietary application program interface and content services (e.g., conventions for searching and manipulating content, versioning, lifecycles, and data formats). Furthermore, each time a repository is added to an application, the application software must be modified to accommodate these differences. What is needed is a coherent system and method for interacting with disparate repositories and for providing a uniform set of content services across all repositories, including those that lack such services.

DETAILED DESCRIPTION

Figure 1:
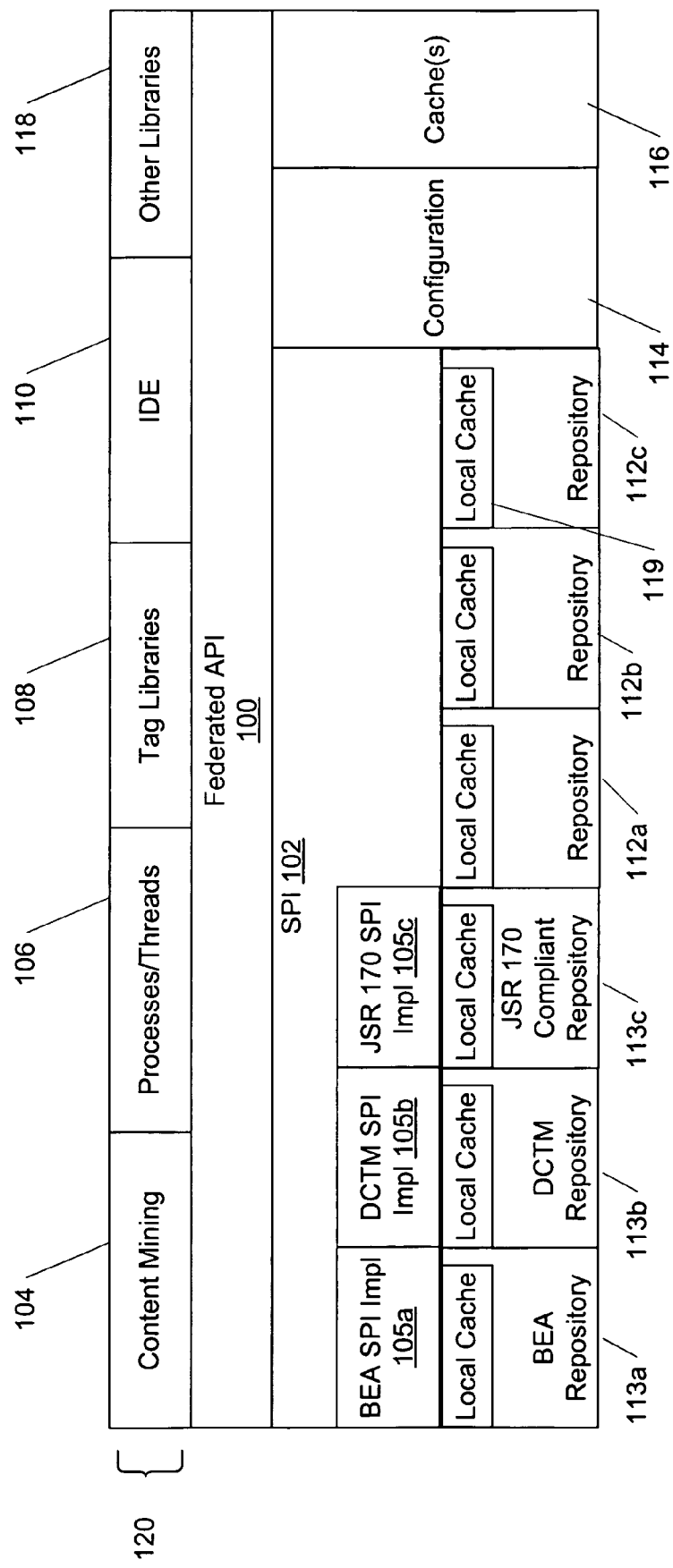
FIG. 1 is an illustration of functional system layers in various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for providing extensions to a Service Provider Interface (SPI) in a content management system. These mechanisms and methods for providing extensions to a Service Provider Interface (SPI) in a content management system can enable embodiments to integrate one or more of a plurality of content repositories into a virtual content repository (VCR) by mapping requests to access content received via a common Application Programming Interface (API) to at least one JSR-170 compliant repository and at least one SPI compliant repository. The ability of embodiments to provide so integrate disparate content repositories can enable one or more of navigation, CRUD operations (create, read, update, delete), versioning, workflows, and searching operations to operate on a plurality of repositories as though the plurality of repositories were one repository.

In an embodiment and by way of example, a method for providing extensions to a Service Provider Interface (SPI) in a content management system is provided. The method embodiment includes receiving a plurality of content repositories. The plurality of content repositories includes at least one JSR-170 compliant repository and at least one SPI compliant repository. Each one of the plurality of content repositories is integrated into a virtual content repository (VCR) by mapping requests to access content received via a common Application Programming Interface (API) to the at least one JSR-170 compliant repository and the at least one SPI compliant repository. Content in the plurality of content repositories is then managed based upon the VCR.

As used herein, the term JSR-170 compliant means that in accordance to the JSR-000170 Content Repository for Java™ Technology API Specification, a copy of which may be obtained from the Java Community Process Website (http://www.icp.org) (last accessed Apr. 25, 2006.

While the present invention is described with reference to an embodiment in which techniques for providing extensions to a Service Provider Interface (SPI) in a content management system are implemented in an application server in conformance with the J2EE Management Framework using executable programs written in the Java™ programming language, the present invention is not limited to the J2EE Management Framework nor the Java™ programming language. Embodiments may be practiced using other interconnectivity specifications or programming languages, i.e., JSP and the like without departing from the scope of the embodiments claimed. (Java™ is a trademark of Sun Microsystems, Inc.).

FIG. 1 is an illustration of functional system layers in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A content repository 112 represents a searchable data store. Such systems can relate structured content and unstructured content (e.g., digitally scanned paper documents, Extensible Markup Language, Portable Document Format, Hypertext Markup Language, electronic mail, images, video and audio streams, raw binary data, etc.) into a searchable corpus. Content repositories can be coupled to or integrated with content management systems. Content management systems can provide for content workflow management, versioning, content review and approval, automatic content classification, event-driven content processing, process tracking and content delivery to other systems. By way of illustration, if a user fills out a loan application on a web portal, the portal can forward the application to a content repository which, in turn, can contact a bank system, receive notification of loan approval, update the loan application in the repository and notify the user by rendering the approval information in a format appropriate for the web portal.

A virtual or federated content repository (hereinafter referred to as "VCR") is a logical representation of one or more individual content repositories. For example, the VCR provides a single access point to multiple repositories from the standpoint of application layer 120 but does not shield from the user that there is more than one repository available. The VCR can also add content services to repositories that natively lack them. Typically, the user interacts with the VCR by specifying which repository an action is related to (such as adding a new node), or performing an action that applies to all repositories (such as searching for content). In various embodiments and by way of illustration, this can be accomplished in part by use of an API (application program interface) 100 and an SPI (service provider interface) 102. An API describes how entities in the application layer can interface with some program logic or functionality. The application layer can include applications (and subdivisions thereof) that utilize the API, such as processes, threads, servlets, portlets, objects, libraries, and other suitable application components. An SPI describes how a service provider (e.g., a content repository, a content management system) can be integrated into a system of some kind. The SPI isolates direct interaction with repositories from the API. In various embodiments, this can be accomplished at run-time wherein the API library dynamically links to or loads the SPI library. In another embodiment, the SPI can be part of a server process such that the API and the SPI can communicate over a network. The SPI can communicate with the repositories using any number of means including, but not limited to, shared memory, remote procedure calls and/or via one or more intermediate server processes.

Content repositories may comprise a variety of interfaces for connecting with the repository. For example, as shown in FIG. 1, a BEA format repository 113a provided by BEA Systems, Inc. of San Jose, Calif., a Documentum™ format repository 113b, provided by EMC Corp. of Hopkinton, Mass., and a JSR-170 compliant repository 113c may be integrated into a VCR and made accessible via a single federated API 100 by SPI 102. Individual SPI implementations 105a, 105b, 105c provide format specific service provider interfaces to the BEA format repository 113a, the Documentum™ format repository 113b, and the JSR-170 format repository 113c, respectively. It is noteworthy that not all of the formats illustrated in FIG. 1 will be present in all embodiments. Further, some embodiments will include other repository formats not illustrated by FIG. 1 for brevity.

API's and SPI's can be specified as a collection of classes/interfaces, data structures and/or methods/functions that work together to provide a programmatic means through which VCR service(s) can be accessed and utilized. By way of illustration, APIs and SPIs can be specified in an object-oriented programming language, such as Java™ (available from Sun Microsystems, Inc. of Mountain View, Calif.) and C# (available from Microsoft Corp. of Redmond, Wash.). The API and SPI can be exposed in a number of ways, including but not limited to static libraries, dynamic link libraries, distributed objects, servers, class/interface instances, and other suitable means.

In various embodiments, the API presents a unified view of all repositories to the application layer such that navigation, CRUD operations (create, read, update, delete), versioning, workflows, and searching operations initiated from the application layer operate on the repositories as though they were one. Repositories that implement the SPI can "plug into" the VCR. The SPI includes a set of interfaces and services that support API functionality at the repository level. The API and SPI share a content model that represents the combined content of all repositories as a hierarchical namespace of nodes. Given a node N, nodes that are hierarchically inferior to N are referred to as children of N, whereas nodes that are hierarchically superior to N are referred to as parents of N. The topmost level of the hierarchy is termed the federated root. There is no limit to the depth of the hierarchy. In various embodiments, repositories are children of the federated root. Each repository can itself have children.

By way of illustration, content mining facilities 104, processes/threads 106, tag libraries 108, integrated development environments (IDEs) 110, and other libraries 118 can all utilize the API to interact with a VCR. An IDE can provide the ability for a user to interactively build workflows and/or content views. Content mining facilities can include services for automatically extracting content from the VCR based on parameters. Java ServerPages™ tag libraries enable portals to interact with the VCR and surface its content on web pages. (Java ServerPages™ is available from Sun Microsystems, Inc.) In addition, it will be apparent to those of skill in the art that many other types of applications and software components utilize the API and are, as such, fully within the scope and spirit of the present disclosure.

In various embodiments, the API can include optimizations to improve the performance of interacting with the VCR. One or more caches 116 can be used to buffer search results and/or recently accessed nodes. Some implementations may include additional cache 119 in one or more repositories. In various embodiments, a cache can include a node cache and/or a binary cache. A node cache can be used to provide fast access to recently accessed nodes whereas a binary cache can be used to provide fast access to the binary content/data associated with each node in a node cache. The API can also provide a configuration facility 114 to enable applications, tools and libraries to configure caches and the VCR. In various embodiments, this facility can be can be configured via Java Management Extension (JMX) (available from Sun Microsystems, Inc.).

In various embodiments, a model for representing hierarchy information, content and data types is shared between the API and the SPI. In this model, a node can represent hierarchy information, content or schema information. Hierarchy nodes can serve as containers for other nodes in the namespace akin to a file subdirectory in a hierarchical file system. Schema nodes represent predefined data types. Content nodes represent content/data. Nodes can have a shape defined by their properties. A property associates a name, a data type and an optional a value that is appropriate for the type. In certain of these embodiments, the properties of content nodes contain values. By way of an illustration, a type can be any of the types described in Table 1. Those of skill in the art will appreciate that many more types are possible and fully within the scope and spirit of the present disclosure.

TABLE 1

Exemplary Property Types in Various Embodiments

| PROPERTY TYPE | DESCRIPTION |
|---|---|
| Basic | Text, a number, a date/time, a Boolean value, a choice, an image, a sound, a bit mask, an audio/visual presentation, binary data. |
| Link | A pointer/reference to data that lives "outside" of a node. |
| Lookup | An expression to be evaluated for locating another node in the VCR |
| Database Mapped (or schema) | Maps to an existing database table or view. |
| Nested | One or more schemas define individual properties. |

In various embodiments, a property can also indicate whether it is required, whether it is read-only, whether it provides a default value, and whether it specifies a property choice. A property choice indicates if a property is a single unrestricted value, a single restricted value, a multiple unrestricted value, or a multiple restricted value. Properties that are single have only one value whereas properties that are multiple can have more than one value. If a property is restricted, its value(s) are chosen from a finite set of values. But if a property is unrestricted, any value(s) can be provided for it. A property can also be designated as a primary property. By way of illustration, the primary property of a node can be considered its default content. For example, if a node contained a binary property to hold an image, it could also contain a second binary property to represent a thumbnail view of the image. If the thumbnail view was the primary property, software applications such as browser could display it by default.

A named collection of one or more property types is a schema. A schema node is a place holder for a schema. In various embodiments, schemas can be used to specify a node's properties. By way of illustration, a Person schema with three properties (Name, Address and DateofBirth) can be described for purposes of discussion as follows:

Schema Person = {
<Name=Name, Type=Text>,
<Name=Address, Type=Address>,
<Name=DateofBirth, Type=Date>}

Various embodiments allow a node to be defined based on a schema. By way of illustration, a content node John can be given the same properties as the schema Person:

Content Node John is a Person

In this case, the node John would have the following properties: Name, Address and DateofBirth. Alternatively, a node can use one or more schemas to define individual properties. This is sometimes referred to as nested types. In the following illustration, John is defined having an Info property that itself contains the properties Name, Address and DateofBirth. In addition, John also has a CustomerId property:

Content Node John = {
<Name=Info, Type=Person>,
<Name=CustomerId, Type=Number> }

Schemas can be defined logically in the VCR and/or in the individual repositories that form the VCR. In certain embodiments, schemas can inherit properties from at least one other schema. Schema inheritance can be unlimited in depth. That is, schema A can inherit from schema B, which itself can inherit from schema C, and so on. If several schemas contain repetitive properties, a "base" schema can be configured from which the other schemas can inherit. For example, a Person schema containing the properties Name, Address and DateofBirth, can be inherited by an Employee schema which adds its own properties (i.e., Employee ID, Date of Hire and Salary):

Schema Employee inherits from Person = {
<Name=EmployeeID, Type= Number>,
<Name=DateofHire, Type=Date>,
<Name=Salary, Type= Number> }

Thus, as defined above the Employee schema has the following properties: Name, Address, Dateofbirth, EmployeeID, DateofHire and Salary. If the Person schema had itself inherited properties from another schema, those properties would also belong to Employee.

In various embodiments, nodes have names/identifiers and can be specified programmatically or addressed using a path that designates the node's location in a VCR namespace. By way of illustration, the path can specify a path from the federated root ('/') to the node in question ('c'):

/a/b/c

In this example, the opening '/' represents the federated root, 'a' represents a repository beneath the federated root, 'b' is a hierarchy node within the 'a' repository, and 'c' is the node in question. The path can also identify a property ("property1") on a node:

/a/b/c.property1

In aspects of these embodiments, the path components occurring prior to the node name can be omitted if the system can deduce the location of the node based on context information.

In various embodiments, a schema defined in one repository or the VCR can inherit from one or more schemas defined in the same repository, a different repository or the VCR. In certain aspects of these embodiments, if one or more of the repositories implicated by an inherited schema do not support inheritance, the inheriting schema can be automatically defined in the VCR by the API. In one embodiment, the inheriting schema is defined in the VCR by default.

By way of illustration, the Employee schema located in the Avitech repository inherits from the Person schema located beneath the Schemas hierarchy node in the BEA repository:

```
Schema /Avitech/Employee inherits from /BEA/Schemas/Person = {
    <Name=EmployeeID, Type= Number>,
    <Name=DateofHire, Type=Date>,
    <Name=Salary, Type= Number> }
```

In various embodiments, the link property type (see Table 1) allows for content reuse and the inclusion of content that may not be under control of the VCR. By way of illustration, the value associated with a link property can refer/point to any of the following: a content node in a VCR, an individual property on a content node in a VCR, a file on a file system, an object identified by a URL (Uniform Resource Locator), or any other suitable identifier. In various embodiments, when editing a content node that has a link property type, a user can specify the link destination (e.g., using a browser-type user interface). In certain aspects of these embodiments, if a link refers to a content node or a content node property that has been moved, the link can be resolved automatically by the system to reflect the new location.

In various embodiments, a value whose type is lookup (see Table 1) can hold an expression that can be evaluated to search the VCR for instances of content node(s) that satisfy the expression. Nodes that satisfy the expression (if any) can be made available for subsequent processing. In various embodiments, a lookup expression can contain one or more expressions that can substitute expression variables from: the content node containing the lookup property, a user profile, anything in the scope of a request or a session. In various embodiments, an expression can include mathematical, logical and Boolean operators, function/method invocations, macros, SQL (Structured Query Language), and any other suitable query language. In various embodiments, an expression can be pre-processed one or more times to perform variable substitution, constant folding and/or macro expansion. It will be apparent to those of skill in the art that many other types of expressions are possible and fully within the scope and spirit of this disclosure.

In various embodiments, when editing a content node that has a lookup property type, the user can edit the expression through a user interface that allows the user to build the expression by either entering it directly and/or by selecting its constituent parts. In addition, the user interface can enable the user to preview the results of the expression evaluation.

Database mapped property types (see Table 1) allow information to be culled (i.e., mapped) from one or more database tables (or other database objects) and manipulated through node properties. By way of illustration, a company might have "content" such as news articles stored as rows in one or more RDBMS (Relational Database Management System) tables. The company might wish to make use of this "content" via their portal implementation. Further, they might wish to manage the information in this table as if it existed in the VCR. Once instantiated, a content node property that is of the database mapped type behaves as though its content is in the VCR (rather than the database table). In one embodiment, all API operations on the property behave the same but ultimately operate on the information in the database table.

In various embodiments, a given database mapped property type can have an expression (e.g., SQL) which, when evaluated, resolves to a row and a column in a database table (or resolves to any kind of database object) accessible by the system over one or more networks. A database mapped property will be able to use either native database tables/objects or database views on those tables/objects. It will be appreciated by those of skill in the art that the present disclosure is not limited to any particular type of database or resolving expression.

In aspects of certain embodiments, a schema can be automatically created that maps to any row in a database table. The system can inspect the data structure of the table and prepopulate the schema with database mapped properties corresponding to columns from the table. The table column names can be used as the default property names and likewise the data type of each column will determine the data type of each corresponding property. The system can also indicate in the schema which properties correspond to primary key columns. If certain columns from the table are not to be used in the new schema, they can be un-mapped (i.e. deselected) by a user or a process. A content node can be based on such a schema and can be automatically bound to a row in a database table (or other database object) when it is instantiated. In various embodiments, a user can interactively specify the database object by browsing the database table.

While not required by all embodiments, some embodiments employ a display template (or "template") to display content based on a schema. Templates can implement various "views". By way of illustration, views could be "full", "thumbnail", and "list" but additional "views" could be defined by end-users. A full view can be the largest, or full page view of the content. A thumbnail view would be a very small view and a list view can be used when displaying multiple content nodes as a "list" on the page (e.g., a product catalog search results page). In various embodiments, the association between a schema and templates can be one-to-many. A template can be designated as the default template for a schema. In certain of these embodiments, templates can be designed with the aid of an integrated development environment (IDE). It is noteworthy that template technology is not limited to web applications. Other delivery mechanisms such as without limitation mobile phones, XML, and the like can be enabled by this technology.

In various embodiments and by way of illustration, display templates can be implemented using HTML (Hypertext Markup Language) and JSP (Java® Server Pages). By way of a further illustration, such a display template can be accessed from a web page through a JSP tag that can accept as an argument the identifier of a content node. Given the content node, the node's schema and associated default display template can be derived and rendered. Alternatively, the JSP tag can take an additional argument to specify a view other than the default. In another embodiment, display templates can be automatically generated (e.g., beforehand or dynamically at run-time) based on a content node's schema. In other embodiments, the view (e.g., full, thumbnail, list) can be determined automatically based on the contents of an HTTP request.

In various embodiments, a role is a dynamic set of users. By way of illustration, a role can be based on functional responsibilities shared by its members. In aspects of these embodiments, a role can be defined by one or more membership criteria. Role mapping is the process by which it is determined whether or not a user satisfies the membership criteria for a given role. For purposes of discussion, a role can be described as follows:

Role=PMembers+[Membership Criteria]

where PMembers is a set of user(s), group(s) and/or other role(s) that form a pool of potential members of this role subject to the Membership Criteria, if any. A user or a process can be in a role, if that user or process belongs to PMembers or satisfies the Membership Criteria. It is noteworthy that a user or process does not need to be a member of PMembers to be considered a member of the role. For example, it is possible to define a role with a criterion such as: "Only on Thursdays" as its membership criteria. All users would qualify as a member of this role on Thursdays. The Membership Criteria can include one or more conditions. By way of illustration, such conditions can include, but are not limited to, one or more (possibly nested and intermixed) Boolean, mathematical, functional, relational, and/or logical expressions. By way of illustration, consider the following Administrator role:

Administrator=Joe, Mary, SuperUser+CurrentTime>5:00 pm

The role has as its potential members two users (Joe and Mary) and users belonging to the user group named SuperUser. The membership criteria includes a condition that requires the current time to be after 5:00 pm. Thus, if a user is Joe, Marry or belongs to the SuperUser group, and the current time is after 5:00 pm, the user is a member of the Administrator role.

In various embodiments, roles can be associated with Resource(s). By way of illustration, a resource can be any system and/or application asset (e.g., VCR nodes and node properties, VCR schemas and schema properties, operating system resources, virtual machine resources, J2EE application resources, and any other entity that can be used by or be a part of software/firmware of some kind). Typically, resources can be arranged in one or more hierarchies such that parent/child relationships are established (e.g., the VCR hierarchical namespace and the schema inheritance hierarchy). In certain of these embodiments, a containment model for roles is followed that enables child resources to inherit roles associated with their parents. In addition, child resources can override their parents' roles with roles of their own.

In various embodiments, Membership Criteria can be based at least partially on a node's properties. This allows for roles that can compare information about a user/process to content in the VCR, for example. In various embodiments, a node's property can be programmatically accessed using dot notation: Article.Creator is the Creator property of the Article node. By way of illustration, assume an Article node that represents a news article and includes two properties: Creator and State. A system can automatically set the Creator property to the name of the user that created the article. The State property indicates the current status of the article from a publication workflow standpoint (e.g., whether the article is a draft or has been approved for publication). In this example, two roles are defined (see Table 2).

TABLE 2

Exemplary Roles in an Embodiment

| ROLE NAME | ASSOCIATED WITH | PMEMBERS | MEMBERSHIP CRITERIA |
| --- | --- | --- | --- |
| Submitter | Article | Article.Creator | Article.State = Draft |
| Approver | Article | Editor | Article.State = (Submitted or Approved) |

The Submitter and Approver roles are associated with the Article node. Content nodes instantiated from this schema will inherit these roles. If a user attempting to access the article is the article's creator and the article's state is Draft, the user can be in the Submitter role. Likewise, if a user belongs to an Editor group and the article's state is Submitted or Approved, then the user can belong to the Approver role.

In various embodiments, a policy can be used to determine what capabilities or privileges for a given resource are made available to the policy's Subjects (e.g., user(s), group(s) and/ or role(s)). For purposes of discussion, a policy can be described as follows:

Policy=Resource+Privilege(s)+Subjects+[Policy Criteria]

Policy mapping is the process by which Policy Criteria, if any, are evaluated to determine which Subjects are granted access to one or more Privileges on a Resource. Policy Criteria can include one or more conditions. By way of illustration, such conditions can include, but are not limited to, one or more (possibly nested and intermixed) Boolean, mathematical, functional, relational, and/or logical expressions. Aspects of certain embodiments allow policy mapping to occur just prior to when an access decision is rendered for a resource.

Similar to roles, in certain of these embodiments a containment model for policies is followed that enables child resources to inherit policies associated with their parents. In addition, child resources can override their parents' polices with policies of their own.

In various embodiments, policies on nodes can control access to privileges associated with the nodes. By way of illustration, given the following policies:

Policy1=Printer504+Read/View+Marketing

Policy2=Printer504+All+Engineering the Marketing role can read/view and browse the Printer504 resource whereas the Engineering role has full access to it ("All"). These privileges are summarized in Table 3. Policy1 allows a user in the Marketing role to merely view the properties of Printer504 whereas Policy2 allows a user in the Engineering role to view and modify its properties, to create content nodes based on Printer504 (assuming it is a schema), and to delete the resource.

TABLE 3

Exemplary Privileges for a "Printer504" Node in Various Embodiments

| ROLE | CREATE | READ/VIEW | UPDATE | DELETE | BROWSE |
|---|---|---|---|---|---|
| Marketing |   | x |   |   | x |
| Engineering | x | x | x | X | x |

Aspects of certain of these embodiments include an implied hierarchy for privileges wherein child privilege(s) of a parent privilege are automatically granted if the parent privilege is granted by a policy.

In various embodiments, the containment models for polices and roles are extended to allow the properties of a node to inherit the policies and roles that are incident on the node. Roles/polices on properties can also override inherited roles/polices. For purposes of illustration, assume the following policy on a Power property of Printer504:

Policy3=Printer504.Power+Update+Marketing

In Policy3, the Marketing role is granted the right to update the Power property for the printer resource Printer504 (e.g., control whether the printer is turned on or off). By default, the Read/View property is also granted according to an implied privilege hierarchy. (There is no Browse privilege for this property.) See Table 4. Alternatively, if there was no implied privilege hierarchy, the Power property would inherit the read/view privilege for the Marketing role from its parent, Printer504. Although no policy was specified for the Power property and the Engineering role, the privileges accorded to the Engineering role can be inherited from a parent node. These privileges are summarized in Table 4.

TABLE 4

Exemplary Privileges for the "Power" Property in the "Printer504" Node

| ROLE | CREATE | READ/VIEW | UPDATE | DELETE |
|---|---|---|---|---|
| Marketing |   | X | x |   |
| Engineering | X | X | x | x |

In various embodiments, the ability to instantiate a node based on a schema can be privileged. This can be used to control which types of content can be created by a user or a process. By way of illustration, assume the following policy:

Policy4=Press_Release+Instantiate+Marketing, Manager

Policy4 specifies that nodes created based on the schema Press_Release can only be instantiated by users/processes who are members of the Marketing and/or Manager roles. In aspects of certain of these embodiments, user interfaces can use knowledge of these policies to restrict available user choices (e.g., users should only be able to see and choose schemas on which they have the Instantiate privilege).

In various embodiments, policies can be placed on schemas. For purposes of illustration, assume the following policies:

Policy5=Press_Release+Read/View+Everyone

Policy6=Press_Release+All+Public_Relations

TABLE 5

Exemplary Privileges for the "Press Release" Schema

| ROLE | CREATE INSTANCE | READ/VIEW | UPDATE | DELETE | BROWSE |
|---|---|---|---|---|---|
| Everyone |   | X |   |   | x |
| Public Relations | x | X | x | x | x |

With reference to Table 5 and by way of illustration, assume a content node instance was created based on the Press Release schema. By default, it would have the same roles/polices as the Press Release schema. If a policy was added to the node giving a role "Editor" the privilege to update the node, the result would be additive. That is, Everyone and Public Relations would maintain their original privileges.

In various embodiments, policies can be placed on properties within a schema, including property choices. (Property choices are a predetermined set of allowable values for a given property. For example, a "colors" property could have the property choices "red", "green" and "blue".)

Figure 2:
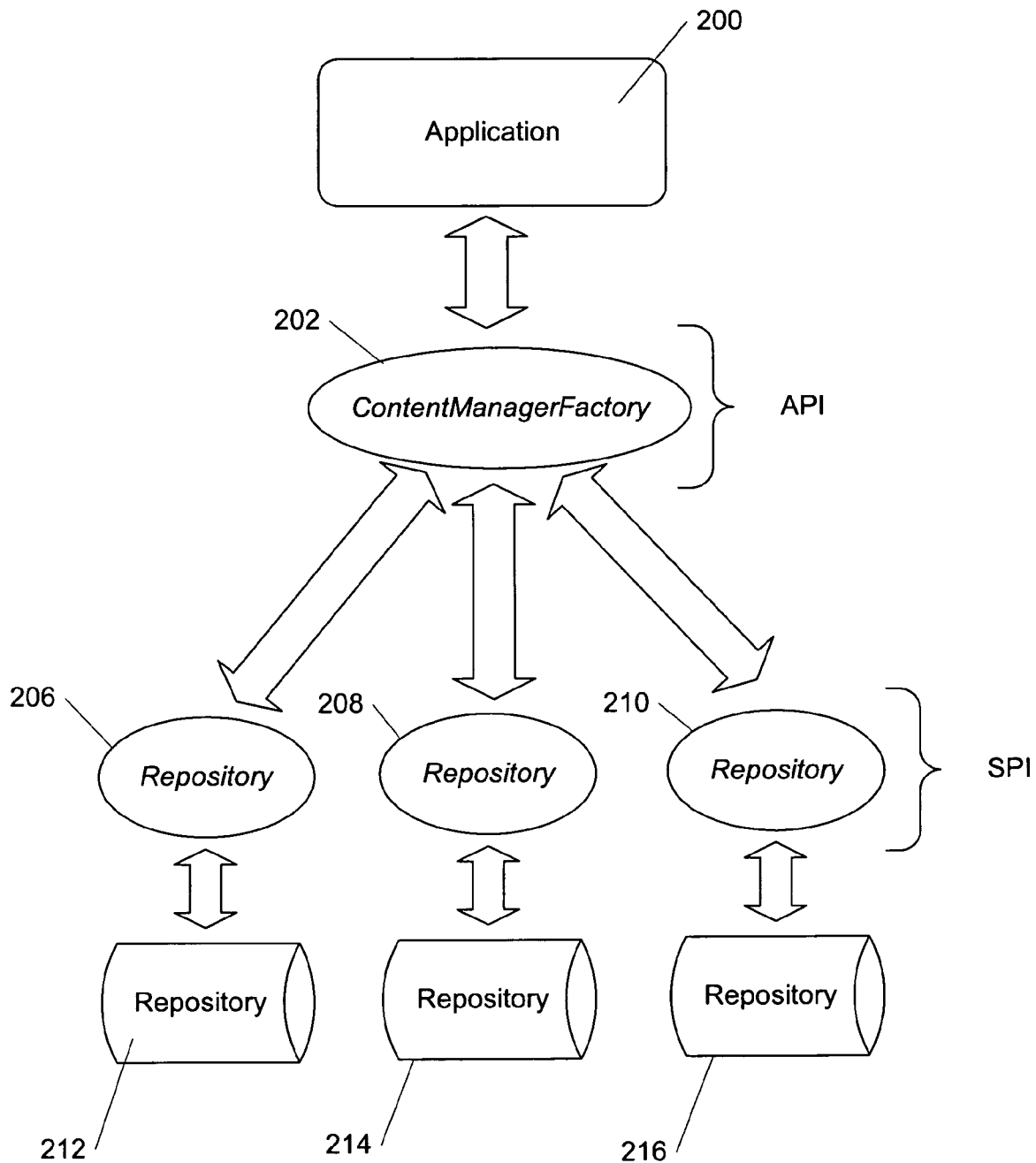
FIG. 2 is an illustration of objects/interfaces that can be used to interface repositories comprising content in various embodiments.

FIG. 2 is an illustration of objects/interfaces that can be used to interface repositories comprising content in various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The ContentManagerFactory 202 can serve as a representation of an access device from an application program's 200 point of view. In aspects of these embodiments, the ContentManagerFactory attempts to connect all available repositories to the device (e.g., 212-216); optionally with user or process credentials. In various embodiments, this can be based on the Java™ Authentication and Authorization Service (available from Sun Microsystems, Inc.). Those of skill in the art will recognize that many authorization schemes are possible without departing from the scope and spirit of the present disclosure. An SPI Repository object 206-210 represents each available content repository. In an embodiment, the ContentManagerFactory can invoke a connect( ) method on the set of Repository objects. It is noteworthy that, in some embodiments, the notion of "connecting" to a repository is not exposed to users. In various embodiments, the ContentManagerFactory returns a list of repository session objects to the application program, one for each repository for which a connection was attempted. Any error in the connection procedure can be described by the session object's state. In another embodiment, the ContentManagerFactory can connect to a specific repository given the repository name. In various embodiments, the name of a repository can be a URI (uniform resource identifier).

Figure 3:
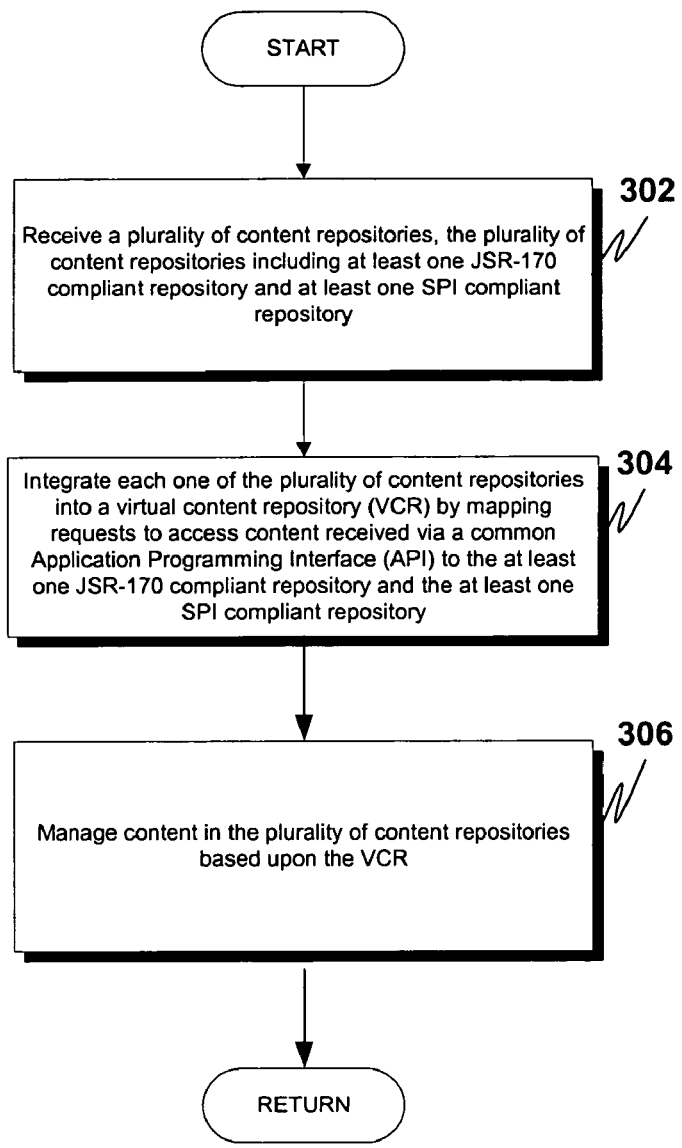
FIG. 3 is an operational flow diagram illustrating a high level overview of a technique for providing extensions to a Service Provider Interface (SPI) in a content management system in an embodiment.

FIG. 3 is an operational flow diagram illustrating a high level overview of a technique for providing extensions to a Service Provider Interface (SPI) in a content management system in an embodiment. The technique for providing extensions to a Service Provider Interface (SPI) in a content management system shown in FIG. 3 is operable with an Application Program Interface (API), such as the federated API 100 of FIG. 1, for example. As shown in FIG. 3, a plurality of content repositories is received. The plurality of content repositories includes at least one JSR-170 compliant repository and at least one SPI compliant repository (block 302). For example and without limitation, this can include receiving at least one content repository relating structured content and unstructured content into a searchable corpus and complying with the JSR-170 specification and at least one content repository that does not comply with the JSR-170 specification. Then, each one of the plurality of content repositories is integrated into a virtual content repository (VCR) by mapping requests to access content received via a common Application Programming Interface (API) to the at least one JSR-170 compliant repository and the at least one SPI compliant repository (block 304). By way of example and without limitation, this can include federating content within the at least one JSR-170 compliant repository and the at least one SPI compliant repository to make the data accessible via a single programming interface. Content in the plurality of content repositories is then managed based upon the VCR (block 306). In embodiments, managing content can include without limitation enabling at least one of navigation, CRUD operations (create, read, update, delete), versioning, workflows, and searching operations to operate on a plurality of repositories as though the plurality of repositories were one repository. Some embodiments can also include receiving a request to access content received via a common Application Programming Interface (API) (not shown in FIG. 3 for brevity).

In some embodiments, the Federated API methods are mapped to a JSR-170 repository. The JSR-170 repository may only be accessed via an 'adapter' to afford control over which JSR-170 features are used and how, in order to facilitate the mapping. If customer code is directly accessing the JSR-170 API and using its features, then this mapping becomes more difficult.

Some embodiments expose a subset of JSR-170 features/capabilities via the Federated API. For example and without limitation, the JSR-170 concepts of child node definitions (which have no BEA content management equivalent) may not be exposed in the Federated API by certain embodiments.

Embodiments may provide a Federated API with a look and feel of the JSR-170 public API when JSR-170 compliant repositories are federated. In some embodiments, the federated API can map the JSR-170 interfaces to the Documentum content management implementation. An alternative embodiment includes two federated APIs that implement a common interface for read access. The content management tags, Template Services, and client code could use this interface.

Embodiments can provide benefits of querying across multiple repositories, using workflow techniques for versioning, and for accessing legacy data in BEA repositories by providing a BEA Federated API that is JSR-170 compliant. However, additional features and functions may be added in some embodiments. The JSR-170 compliant API provides customers with an incentive to use the Federated API as compared to accessing the JSR-170 interface directly.

In some embodiments, the federated API extends and implements the JSR-170 interfaces. Public API objects proxy in conformance with the JSR-170 API can make it easier for client code to use the API and provide clarity and ease of understanding to the mapping of the federated API and the JSR-170 API.

The Federated API comprises of a set of service classes that provide access to the content functionality. Content functionality can be provided as a core service to a wide variety of applications (portal or otherwise) and may be made accessible to each client of the Application Server in embodiments. Federated API embodiments can provide functions of management of Nodes, Types, Workflow, the Virtual Repository and exposing the Search facility.

One embodiment includes support of JSR-170 that focuses on read-only repository access capabilities including for example and without limitation:
  Access to the repository via Repository and Session
  All JSR-170-based property types (including NAME, PATH, REFERENCE)
  Retrieval and traversal of nodes and properties
  Reading the values of properties
  Basic namespace registry with transient Session-based namespace remapping
  Export of system and document view to either XML stream or SAX events
  Query facility with XPath syntax
  Introspecting type information on existing nodes and discovery of all node types.
  Discovery of access control permissions (add node, set property, remove item, read item) on paths to nodes and properties In another embodiment, support of JSR-170 adds write capabilities including for example and without limitation:
  Adding, moving and removing nodes
  Adding/changing/clearing properties
  Namespace registry supporting persistent namespace changes
  Import from system or document view XML (including import of arbitrary XML)
  Assigning primary and mix-in node types to nodes
  Cloning corresponding nodes across workspaces The JSR-170 standard indicates the API may provide the following optional services, which can be independently added to embodiments:
  Transactions (XA-based)
  Versioning (JSR-147 based), version data exposed in content management as sub-tree (for searching), supports labels, branches and merging. Supports versioning of entire trees as a single version of a parent. Nodes being added to an existing node are implicitly checked out.
  Observation/Events on adding/removing node, adding/removing/changing property
  Locking nodes (shallow or deep)
  Searching Repository Content with SQL
  Same-name siblings (parent node with multiple child nodes having the same name)
  Client-orderable child nodes Repository embodiments will either fully or partially support the following capabilities that are common functionality between Federated API and JSR-170 (though some of the features have different semantic models):
  Retrieval and traversal of nodes and properties
  Reading the values of properties
  Export to XML (via Propagation)
  Query facility (with our own query syntax)
  Discovery of available node types (the BEA Repository provides type management)
  Adding and removing nodes and properties
  Writing the values of properties
  Import from XML (via Propagation)
  Assigning node types to nodes
  Transactions
  Versioning
  Observation The JSR-170 specification employs a different model for updating the repository than that employed by the BEA VCR. With JSR-170, changes made to nodes and properties accumulate on a session (a change bucket, kind of like a transaction), and can be persisted by calling Session.save( ). It is also possible to persist and refresh changes on individual Item trees within the bucket. By comparison, the BEA repository applies changes when any of the Federated API methods are called. Since these methods are called on a per-node basis, the granularity for change is at the Node level. Embodiments may be adapted to support both the BEA legacy method and the Session based model that JSR-170 specifies.

Further, in the JSR-170 specification item persistence is different from the BEA item persistence model. In JSR-170, persistence acts on a tree rooted at the given node, and the BEA item persistence modifies that single node. JSR-170 has two primary persistence models, and they behave differently depending on the Transaction model. In the first persistence model, many methods write to transient storage. Transient storage is validated, and possibly persisted, when either Session.save( )—for all changes in the change bucket, or Item.save( )—for all changes to an item and its subtree, are called. These methods always do bucket or item tree validation. Without transactions, a save is also done. With transactions, a save occurs later on when the transaction is committed. There are related methods Session.refresh( ) and Item.refresh( ) to discard pending changes in the change bucket or a subtree.

In the second persistence model, some methods skip the transient storage. These include Workspace.move( ), copy( ) and importXML( ), as well as Node.checkin( )/checkout ( )/update( ), etc. Without transactions, these methods act immediately on the repository contents. With transactions, the write will occur when the transaction is committed.

In an embodiment and by way of example, simulating the immediate persistence behavior of the BEA Repository may accommodate differences in persistence models. In other words, for those times the session is used, Session.save( ) should be called before the Federated API method completes:

When a JSR-170 workspace method exists (copy, move) then the SPI should use it.
If not (addNode, etc), then we can call Session.save( ) immediately after performing the action.

Embodiments may be adapted to support both the BEA security model and the JSR-170 specification security model. The JSR-170 specification employs a different security model for controlling access to repositories than that employed by the BEA VCR. In the JSR-170 specification, authorization occurs via Repository.login( ) when acquiring a Session on a Workspace, and is associated either in memory via JAAS or with the Session. User identity context info is not passed around with the JSR-170 specification because it is implicit. By comparison, the BEA repository federated APIs require a ContentContext object to be passed.

The JSR-170 specification employs a different security model for controlling access to repositories than that employed by the BEA VCR. In the JSR-170 specification requires the following 'action string' capabilities on Items (Nodes/Properties):

add_node
set_property (set a single property—very granular)
remove (node or property)
read (node or property)

BEA Repository content management supports the following capabilities on Nodes:

Associate (workflow-related)
Create
Delete
Update
View

BEA Repository also supports capabilities on Types, Repositories, and Workflows

BEA Repository also supports both DA and Visitor models for capabilities.

Accordingly, embodiments are adapted to accommodate the following primary difference in security models: the JSR-170 specification supports a more-granular level of security, including setting read/set/remove capabilities on individual properties in a node.

Embodiments may be adapted to support both the BEA search model and the JSR-170 specification search model. The JSR-170 specification uses an XPath-based query language (with SQL optional) while Federated API uses SQL-based query language. Although JSR-170 does not do any federation, it does require metadata search support, via XPath and optionally SQL queries. For example, //element(*, my:type)[@my:title='JSR 170']

JSR-170 search supports the following constructs:
node properties & value constraints
type constraints
path constraints in a workspace
which properties to retrieve
ordering Further, under the JSR-170 specification, queries can be persisted and re-used later on. Further, JSR-170 searches return both Nodes and an in-memory table of results (depending on which properties were selected.)

Embodiments may be adapted to support both the BEA versioning model and the JSR-170 specification versioning model. The JSR-170 specification versioning supports branch/merge. The BEA versioning model supports workflow and per-user task lists Embodiments may provide the following BEA repository features not defined in the JSR-170 specification:

Type Management
  CUD support.
  Nested Types
  Type Inheritance (There is some basic understanding of this in JSR-170.
    The JSR equivalent of property choices is property definition value constraints, although the value constraint is a more flexible construct.
Federated Metadata search (not the SQL based search in the JSR)
Federated "full text" search. Although JSR-170 does not do any federation, it does specify how full-text search queries are expressed and how results scoring are presented.
Workflow lifecycles with per-user task lists
Support for Nodes in BEA Repositories to have Link properties that target nodes in any Repository.

There are a number of capabilities that are required by the JSR-170 specification that the BEA Federated API and virtual repository embodiments may be adapted to support. For example, JSR-170 (but not the BEA Federated APIs) supports the concepts of:

Session for persisting changes in a batch or on trees, and refreshing the batch or trees
Item.read( ) method supporting visitor design pattern for accessing nodes/properties
Support for multiple workspaces (views of a single repository) with different views of repository data (possibly different versions, etc). A given node may be exposed in different workspaces with different paths. Workspace management is outside the JSR.
Addressing differences:
  Path-based addressing to properties
  Both relative and absolute paths
Querying for child nodes or properties via a namePattern
Namespacing for nodes, types, and properties Additional node type info
  the parent node type can specify the required and available types of child nodes. This allows creating a node without specifying its type (type is implicit in node location)
  auto-creation of child nodes
Additional property definition info
  value constraints on property definitions
  undefined property types
Automatic property conversion—reading a String as a Long, setting a Long as a String, etc.
Persistent queries
Cloning Node trees across workspaces (tree appears in both, but can be rooted anywhere)

Embodiments may be adapted to support both the BEA workspace model and the JSR-170 specification workspace model. In JSR-170, there is a concept of having multiple views of the same repository data (possibly different versions), with different hierarchies. These are called Workspaces. This means there may be multiple paths (in different workspaces) to the same Node UID (possibly different versions). The BEA Content management repository presumes the path to a node is unique. In the JSR-170 specification, this is true, within the context of a single workspace. If multiple workspaces are used, this is no longer the case. (unless the workspace is included as part of the context).

Embodiments may resolve the workspace issue by:
Include the workspace name in the repository configuration. This adds context for which a path is unique.
Refrain from using methods accepting a Path argument in the Federated API. (only use methods with IDs)

Embodiments may be adapted to support both the BEA node types model and the JSR-170 specification node types model. The BEA Repository uses Type IDs to reference node types. The JSR-170 specification uses type URI-scoped type names. Embodiments may use one or more of the following options to resolve mapping difficulties arising out of such differences:
Clients use type IDs. Have the SPI map type IDs to type names.
Clients use type names. Have the SPI map type names to type IDs.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for providing extensions to a Service Provider Interface (SPI) in a content management system as discussed herein.

Figure 4:
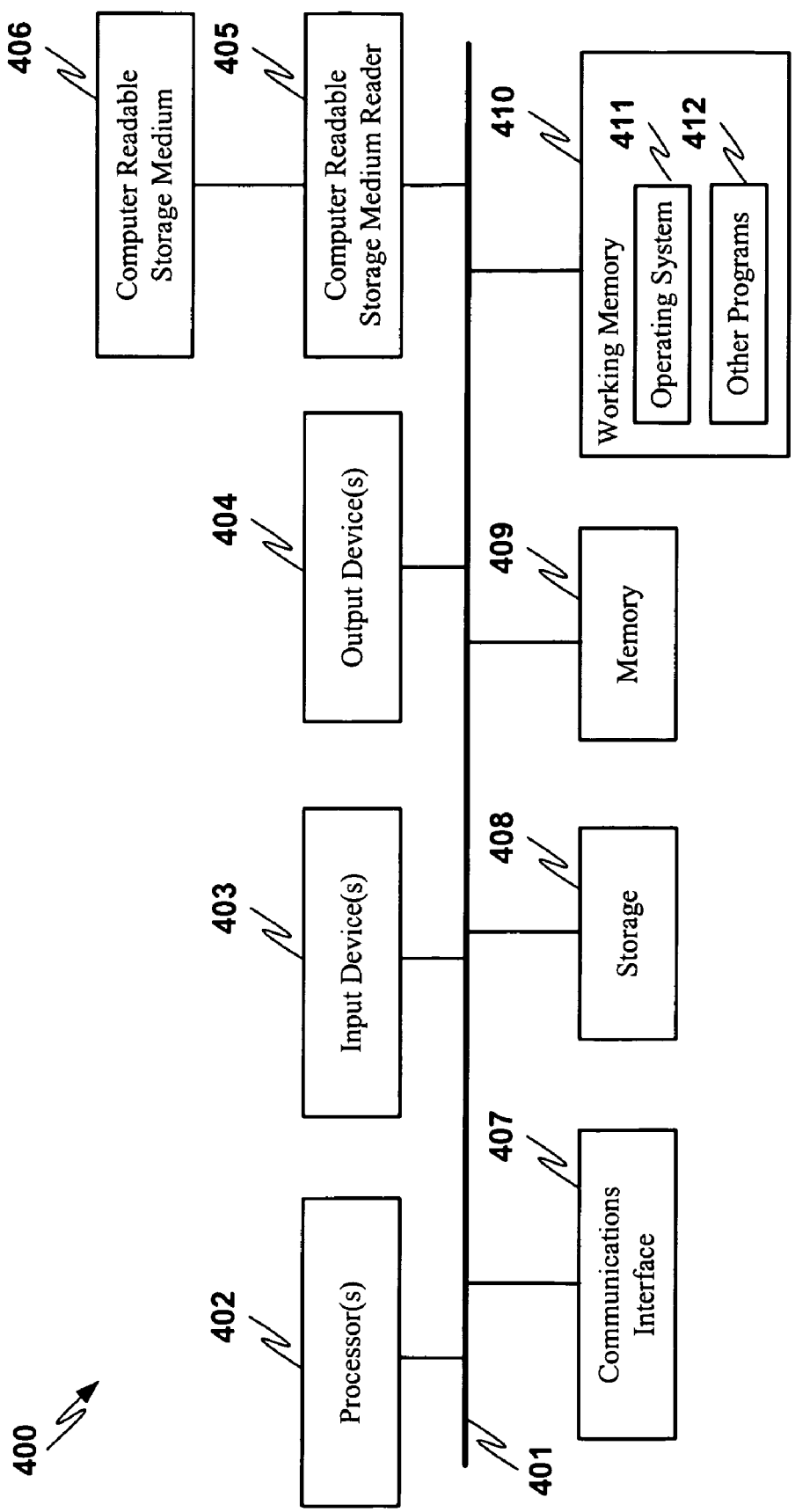
FIG. 4 is a hardware block diagram of an example computer system, which may be used to embody one or more components in an embodiment.

FIG. 4 illustrates a processing system 400, which can comprise one or more of the elements of FIG. 1. Turning now to FIG. 4, a computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for extending a content management system, the method comprising:
   connecting to a plurality of content repositories using a Service Provider Interface (SPI), wherein the plurality of content repositories includes a first content repository and a second content repository;
   integrating the plurality of content repositories into a virtual content repository (VCR);
   receiving a request to access content in both the first content repository and the second content repository from a client, via a common Application Programming Interface (API) associated with the VCR;
   mapping the request to the first content repository and the second content repository correspondingly;
   automatically using an XPath-based query for searching the first content repository and using an SQL-based query for searching the second content repository, wherein the first content repository returns a first result set for the XPath-based query and the second content repository returns a second result set for the SQL-based query, and wherein the first result set and the second result set are in two different format;
   preparing the requested content based on a federation of the first result set for the XPath-based query from the first content repository and the second result set for the SQL-based query from the second content repository; and
   providing the requested content to the client via the API.

2. The method of claim 1, further comprising:
relating structured content and unstructured content into a searchable corpus.

3. The method of claim 1, further comprising:
enabling at least one of navigation, CRUD (Create, Read, Update, Delete), versioning, workflows, and searching operations to operate on the plurality of repositories as though the plurality of repositories were one repository.

4. The method of claim 1, further comprising:
using a node cache to provide fast access to recently accessed nodes in the plurality of content repositories.

5. The method of claim 1, further comprising:
allowing a node in the plurality of content repositories to be any one of:
   a hierarchy node that serves as containers for other nodes;
   a content node that represents content and data; and
   a schema node that is a placeholder for a schema which is a named collection of one or more property types associated with the content node.

6. The method of claim 1, further comprising:
allowing the client to interact with the VCR only through the API without a need to know which content repository contains the requested content.

7. The method of claim 1, further comprising:
accessing the first content repository via an adapter that facilitates a mapping of the request to different content repositories in the VCR.

8. The method of claim 1, further comprising:
associating both the first content repository and the second content repository with a transaction, wherein the first content repository uses a transient storage which is persisted when the transaction is committed, and the second content repository adapts an immediate persistence behavior that persists changes when any API method is called.

9. The method of claim 8, further comprising:
allowing the first content repository to persist the transient storage when a workspace API method is called, in order to simulate the immediate persistence behavior of the second content repository.

10. The method of claim 8, further comprising:
including workspace name in repository configuration for the first content repository, in order to add context to each path and make the path unique at the API level.

11. The method of claim 1, further comprising:
allowing the first content repository and the second content repository to use different security models, wherein the first content repository does not explicitly require context information for authorization when acquiring a session on a workspace, and wherein the second content repository explicitly requires context information for authorization.

12. The method of claim 1, further comprising:
allowing the first content repository and the second content repository to use different workspace models, wherein the first content repository allows multiple paths to a same node, and wherein the second content repository presumes a path to a node is unique.

13. A machine-readable medium storing one or more sequences of instructions for extending a content management system, which instructions, when executed by one or more processors, cause the one or more processors to carry out the steps of:
   connecting to a plurality of content repositories using a Service Provider Interface (SPI), wherein the plurality of content repositories includes a first content repository and a second content repository;
   integrating the plurality of content repositories into a virtual content repository (VCR);

receiving a request to access content in both the first content repository and the second content repository from a client, via a common Application Programming Interface (API) associated with the VCR;

mapping the request to the first content repository and the second content repository correspondingly;

automatically using an XPath-based query for searching the first content repository and using an SQL-based query for searching the second content repository, wherein the first content repository returns a first result set for the XPath-based query and the second content repository returns a second result set for the SQL-based query, and wherein the first result set and the second result set are in two different format;

preparing the requested content based on a federation of the first result set for the XPath-based query from the first content repository and the second result set for the SQL-based query from the second content repository; and providing the requested content to the client via the API.

14. The machine-readable medium as recited in claim 13, further carrying instructions for carrying out the step of:

relating structured content and unstructured content into a searchable corpus.

15. The machine-readable medium as recited in claim 13, further carrying instructions for carrying out the step of:

enabling at least one of navigation, CRUD (Create, Read, Update, Delete), versioning, workflows, and searching operations to operate on the plurality of repositories as though the plurality of repositories were one repository.

16. An apparatus for extending a content management system, the apparatus comprising:

a processor; and one or more stored sequences of instructions which, when executed by the processor, cause the processor to carry out the steps of:

connecting to a plurality of content repositories using a Service Provider Interface (SPI), wherein the plurality of content repositories includes a first content repository and a second content repository;

integrating the plurality of content repositories into a virtual content repository (VCR);

receiving a request to access content in both the first content repository and the second content repository from a client, via a common Application Programming Interface (API) associated with the VCR;

mapping the request to the first content repository and the second content repository correspondingly;

automatically using an XPath-based query for searching the first content repository and using an SQL-based query for searching the second content repository, wherein the first content repository returns a first result set for the XPath-based query and the second content repository returns a second result set for the SQL-based query, and wherein the first result set and the second result set are in two different format;

preparing the requested content based on a federation of the first result set for the XPath-based query from the first content repository and the second result set for the SQL-based query from the second content repository; and providing the requested content to the client via the API.

* * * * *

UNITED STATES PATENT AND TRADEMARK OFFICE
CERTIFICATE OF CORRECTION

| | | |
|---|---|---|
| PATENT NO. | : 7,953,734 B2 | Page 1 of 1 |
| APPLICATION NO. | : 11/435163 | |
| DATED | : May 31, 2011 | |
| INVENTOR(S) | : McVeigh et al. | |

It is certified that error appears in the above-identified patent and that said Letters Patent is hereby corrected as shown below:

In column 1, line 41, delete "Ryan." and insert -- Ryan --, therefor.

In column 3, line 17-18, delete "(http://www.icp.org)" and insert -- (http://www.jcp.org) --, therefor.

In column 21, line 21-25, delete "14. The machine-readable medium as recited in claim 13, further carrying
instructions for carrying out the step of:
relating structured content and unstructured content into a
searchable corpus." and
insert -- 14. The machine-readable medium as recited in claim 13, further carrying
instructions for carrying out the step of:
relating structured content and unstructured content into a searchable corpus. --, therefor.

Signed and Sealed this
Twenty-fifth Day of October, 2011

David J. Kappos
*Director of the United States Patent and Trademark Office*